No. 882,509. PATENTED MAR. 17, 1908.
A. C. WOOD.
APPARATUS FOR PRODUCING OZONE.
APPLICATION FILED OCT. 18, 1904.
3 SHEETS—SHEET 3.
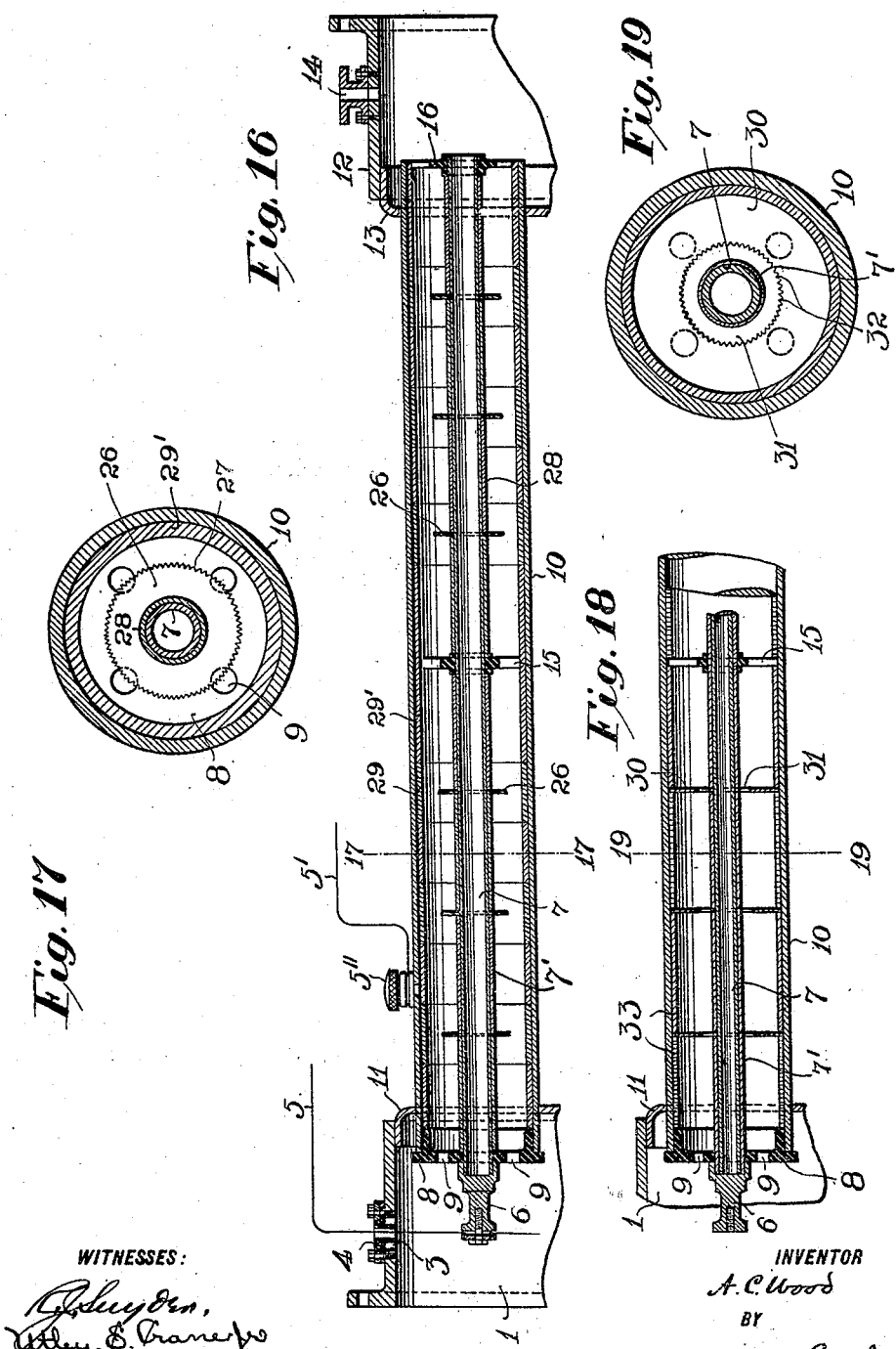
WITNESSES:
INVENTOR
A. C. Wood
BY
C. N. Butler
ATTORNEY.

No. 882,509. PATENTED MAR. 17, 1908.
A. C. WOOD.
APPARATUS FOR PRODUCING OZONE.
APPLICATION FILED OCT. 18, 1904.
3 SHEETS—SHEET 2.
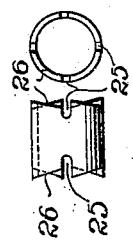
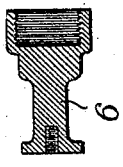
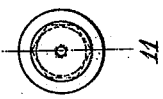
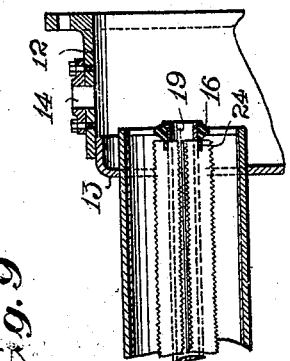
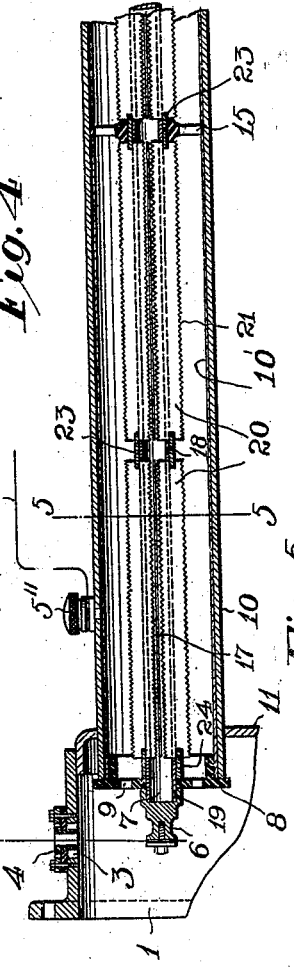
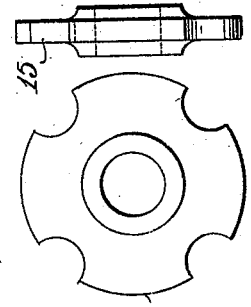
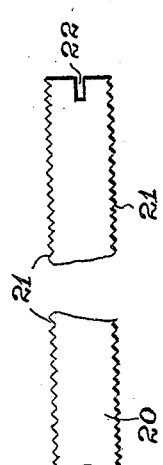
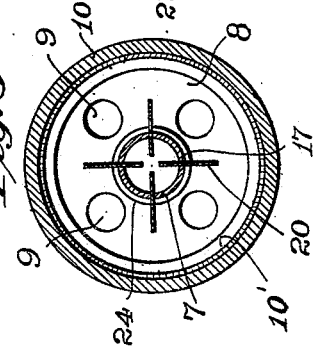
WITNESSES:
INVENTOR
A. C. Wood
BY
C. N. Butler
ATTORNEY.

No. 882,509. PATENTED MAR. 17, 1908.
A. C. WOOD.
APPARATUS FOR PRODUCING OZONE.
APPLICATION FILED OCT. 18, 1904.
3 SHEETS—SHEET 1.
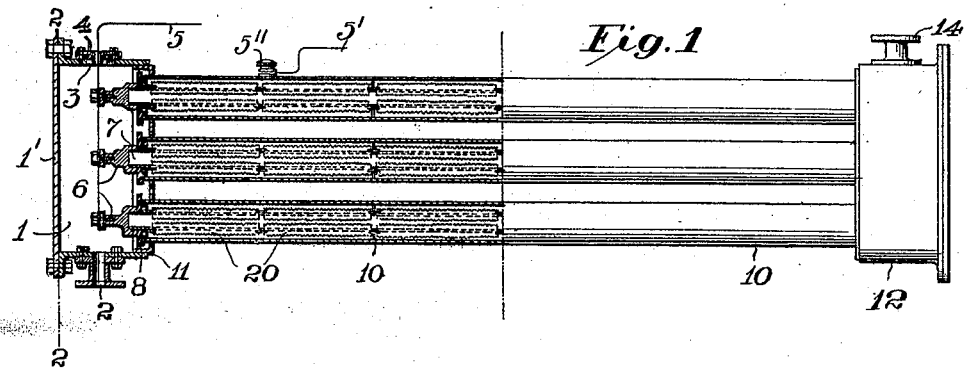
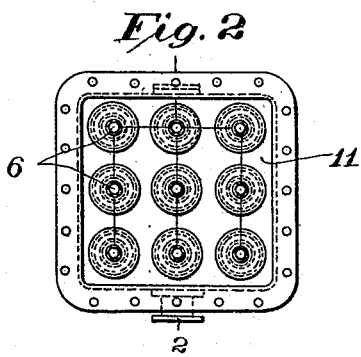
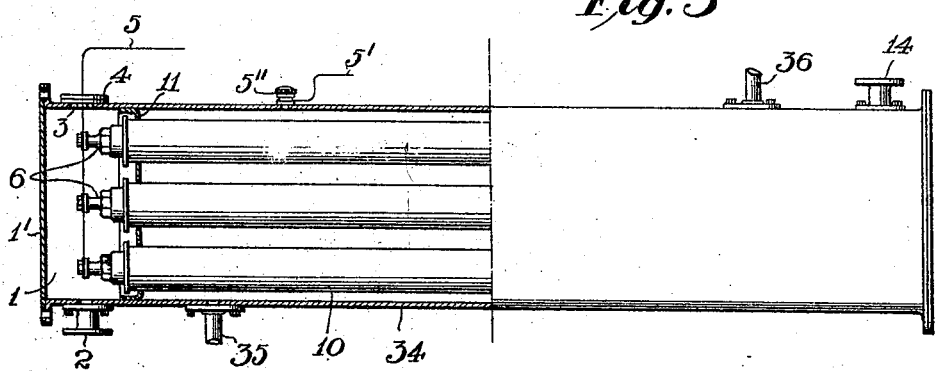
WITNESSES:
INVENTOR
A. C. Wood
BY
C. N. Butler
ATTORNEY.

UNITED STATES PATENT OFFICE.

ALBERT C. WOOD, OF PHILADELPHIA, PENNSYLVANIA.

APPARATUS FOR PRODUCING OZONE.

No. 882,509.

Specification of Letters Patent.

Patented March 17, 1908.

Application filed October 18, 1904. Serial No. 228,941.

*To all whom it may concern:*

Be it known that I, ALBERT C. WOOD, a citizen of the United States, residing at Philadelphia, in the county of Philadelphia and State of Pennsylvania, have invented certain Improvements in Apparatus for Producing Ozone, of which the following is a specification.

This invention relates to the production of ozone or of ozonized air through the action of the "silent" or "brush" discharge of a high tension electric current or charge in an atmosphere of oxygen or air, and it has for its leading objects to produce an apparatus of high capacity and efficiency which will effect a uniformly distributed discharge of electricity into circulating air, and to provide a simplified construction having parts that are self-alining and reversible and that may be readily assembled and dissociated. These and the further objects of my invention will more fully appear by reference to the following description and the accompanying drawings in illustration thereof, of which:—

Figure 1 represents a side elevation and an interior section of an apparatus embodying my improvements, Fig. 2 represents an end elevation of the same with the face separated therefrom on the line 2—2, Fig. 3 represents a side elevation and partial section of an apparatus made according to my invention and having a casing providing for the circulation of a cooling fluid, Fig. 4 represents a longitudinal sectional view of a tube with combs and connections made according to my preferred construction, Fig. 5 represents a sectional view taken on the line 5—5 of Fig. 4, Fig. 6 represents a side view of my preferred form of comb, Fig. 7 represents a face view and Fig. 8 a peripheral view of a spider for centering and supporting the comb holding mechanism, Fig. 9 represents a sectional view of a cap for the tube, Fig. 10 represents an end view and Fig. 11 a longitudinal sectional view of a binding connection, Fig. 12 represents a side view and Fig. 13 an end view of a sleeve for holding the combs, Fig. 14 represents a side view and Fig. 15 represents an end view of a modified form of sleeve for holding the combs, Fig. 16 represents a longitudinal sectional view of a tube containing a modified form of comb and connections, Fig. 17 represents a sectional view taken on the line 17—17 of Fig. 16, Fig. 18 represents a longitudinal sectional view of part of a tube containing a further modification in the form of the comb and connections, and Fig. 19 represents a sectional view taken on the line 19—19 of Fig. 18.

Referring to the drawings, the apparatus comprises a chamber 1, having an air inlet 2, and an opening 3 which receives an insulator 4 for supporting the conductor 5 which is secured to the several binding connections 6 in the chamber. The connections 6 respectively engage the forward ends of hollow rods 7 and bear against the insulating caps 8 through which the rods project. The caps 8, having the apertures 9 therein, fit into and against the forward ends of the several tubes 10 which pass into the chamber through the wall or diaphragm 11 thereof. The tubes are preferably of circular section and made of copper with a lining 10' of nickel or other non corrosive metal. The opposite ends of the tubes 10 pass into the chamber 12 through the wall or diaphragm 13 thereof, the chamber having the outlet 14. The rods 7 have loosely sleeved thereon the apertured insulating disks or spiders 15 which are freely movable in the tubes and serve to center and support the rods and the combs carried thereby. The rearward ends of the rods are centered and supported by apertured insulating disks or spiders 16 having screw threaded connections with the rods and loosely fitting the rearward ends of the tubes.

As shown in detail in Figs. 4 to 15 inclusive, the rods 7 are provided with longitudinal slots 17, arranged in sets separated or limited by the unslotted or solid sections 18 and 19, and in the slots are inserted the combs 20 having the points or serrations 21 along the parallel sides and notches 22 in the middle of the ends thereof. To hold the combs when seated in the slots, the sleeves 23 are placed on the rods about the sections 18, and are engaged with the notches 22 of the adjacent ends of the abutting combs, and the sleeves 24 are placed on the rods about the sections 19 and are engaged with the notches of the abutting combs.

The sleeves may have the plain construction shown in Figs. 12 and 13, or they may employ the construction shown in Figs. 14 and 15 in which notches 25 intersect inclined or wedging end surfaces 26. When brought into registration with the combs, the notches permit the sleeves to be moved longitudinally to a limited extent and the combs to be removed from their seats in the rods, while by bringing the inclines into registration with the notches of the combs and turning the sleeves the combs are securely locked in place.

The construction thus provided, when the chamber plate 1' is removed and the wire 5 disconnected, permits the respective rods together with the several parts connected therewith to be withdrawn as a unit from the tubes in which they are fitted, and by disengaging the binding connection 6 and the spider 16 from a rod, the caps 8 and the sleeves 24 can be slipped back, disengaging the several end combs which may now be removed or drawn back to permit the movement of the sleeves 25 and the removal of the remainder of the combs. There is thus provided a construction readily assembled or dissociated, permitting the combs to be inserted, removed or reversed very readily, while providing for supporting and correctly centering the combs so that their discharging points 21 are uniformly separated from the tubes which receive the discharge. The tubes are electrically connected together by the diaphragms 11 and 13 and to a wire 5' as by a binding post 5''.

As shown in detail in Figs. 16 and 17, the rods 7, provided with a nickel covering 7', have sleeved thereon combs 26 of circular or disk form with peripheral points or serrations 27. The disks are spaced and held in position by the sleeves 28 placed on the rods in abutting relation to the disks, the end sleeves being forced in, to clamp the disks, by means of the binding connections 6 and the caps 8 on the forward ends and the spiders 16 on the rearward ends. The tube 10 may be provided with nickel rings 29 (having a low coefficient of oxidation) which surround the disks to collect the discharges therefrom, the nickel rings alternating with spacing rings 29' which may be composed suitably of copper.

It will be understood that current from the wire 5 is distributed by the connections 6 and the rods 7 to the combs 26 and the discharge therefrom, collected by the rings 28, is carried off by the wire 5' and the intermediate conductors.

As shown in Figs. 18 and 19, there may be used combs 30 in the form of a ring or disk having a circular aperture 31 through the center thereof with inwardly projecting serrations or points 32 surrounding it. These disks are spaced and held in position by the rings or cylindrical sections 33 clamped together as in the case of the rings shown in Figs. 16 and 17. In this construction the rods 7 collect the discharge from the combs 30 and discharge through the connections 6.

By the use of an electrode lined or coated with a metal such as nickel, as herein described, comparative economy of construction is preserved while a highly infusible or refractory and difficultly oxidizable electrode is obtained, which is very desirable, preventing the pitting and deteriorating effect that would otherwise be produced and with the combination herein described avoiding the difficulties of construction, frangibility and lower capacity of an apparatus employing a dielectric.

As shown in Fig. 3 the tubes employed may be surrounded by a casing 34 having the pipe connections 35 and 36, by which a cooling fluid may be circulated in contact with the tubes when required for reducing to or maintaining a low temperature.

From the foregoing it will be understood that air admitted to the chamber 1 by the inlet 2, is carried through the perforated insulating caps 8 and the tubes 10 as also the perforated insulating disks 15 and 16 into the chamber 12, from which it escapes by the outlet 14. In the passage of the air through the tubes it is subjected to the action of what is known as a "silent" or "brush" electric discharge produced by a high tension current or charge of electricity discharging between the conducting rods 7 and the electrodes or conducting tubes 10 by the combs 20, 26 or 30, suitably of nickel, the combs being centered so as to effect a uniform discharge of electricity (with the absence of sparking or arcing) across the air currents, whose ozonification is obtained thereby.

It is to be understood that the term "rod" is used in a generic sense and is not to be construed as limited to a hollow rod, as a solid rod may readily be employed without departing from the invention claimed.

By the expression "brush discharge", as used in the specification and claims, is to be understood the silent discharge that takes place between a surface and a point or line, as distinguished from the sparking discharge which takes place between parallel or concentric surfaces.

Having described my invention, I claim:—

1. In apparatus of the class described a tubular electrode, a rod extending through said electrode, insulators secured to said rod and movable in said electrode for alining said rod and electrically separating it from said electrode, means for passing oxygen through said electrode, and means for effecting an electrical discharge between said rod and electrode.

2. In apparatus of the class described, a tubular electrode, a rod extending through said electrode and having means for effecting a brush discharge, insulators secured to said rod and movable in said electrode for alining said rod and electrically separating it from said electrode, and means for passing oxygen through said electrode, substantially as specified.

3. In apparatus of the class described, a tube, an axial rod extending through said tube, a perforated insulating cap fixed to an end of said rod and fitting into and against an end of said tube, a perforated insulating disk or spider fixed to said rod and movably supported in said tube, chambers communicating with the ends of said tube, and means for effecting an electrical discharge between said rod and tube, substantially as specified.

4. In apparatus of the class described, a tube, an axial rod in said tube, insulating supports fixed to said rod and movable in said tube for centering and supporting said rod, said supports having air passages therethrough, combs for effecting an electrical discharge between said rod and tube, and means for passing air into said tube through said electrical discharge, substantially as specified.

5. In apparatus of the class described, a tube, an axial rod in said tube, a perforated insulating cap on said rod and fitted to an end of said tube, a binding connection which holds said cap on said rod, a chamber, a conductor engaged by said binding connection, said conductor passing through the wall of said chamber and insulated therefrom, and a conductor electrically connected with said tube, substantially as specified.

6. In apparatus of the class described, a slotted rod, combs seated in the slots in said rod, and sleeves movable on said rod for engaging said combs, substantially as specified.

7. In apparatus of the class described, a rod having sets of longitudinal slots therein, sleeves on said rods adjacent to the ends of said slots, and combs in said slots engaged and held by said sleeves, substantially as specified.

8. In apparatus of the class described, a tube, an axial rod in said tube, said rod having longitudinal slots therein, combs in said slots, sleeves on said rod for holding said combs, and insulating supports secured to said rod and fitted to move in said tube, substantially as specified.

9. In apparatus of the class described, a tube, a hollow rod in said tube, said rod having sets of longitudinal slots therein, reversible combs having notched ends and serrated parallel edges, said combs being set in said slots, and sleeves on said rod for engaging the notches in the ends of said combs, substantially as specified.

10. In apparatus of the class described, a slotted rod, a comb seated in a slot in said rod, and a sleeve revoluble on said rod and having an inclined face for wedging and holding the end of said comb, substantially as specified.

11. In apparatus of the class described, a slotted rod, combs seated in slots in said rod, and a sleeve revoluble on said rod and having notches and inclined end surfaces for effecting the engagement and disengagement of said combs, substantially as specified.

12. In apparatus of the class described, mechanism providing a conduit and an electrode through and in contact with the conducting material of which oxygen is passed, said mechanism having a metal body and a lining of highly refractory metal more difficultly oxidizable than the metal of said body, a second electrode within said first electrode, said second electrode being adapted for effecting a brush discharge, and insulating supports engaging said second electrode and movably supported by said first electrode, substantially as specified.

In testimony whereof I have hereunto set my hand this 17th day of October 1904, in the presence of the subscribing witnesses.

ALBERT C. WOOD.

Witnesses:
ROBERT JAMES EARLEY,
UTLEY E. CRANE, Jr.